United States Patent [19]

Kasabian

[11] Patent Number: 4,625,135
[45] Date of Patent: Nov. 25, 1986

[54] PERMANENT MAGNET ROTOR

[75] Inventor: George Kasabian, Los Angeles, Calif.

[73] Assignee: The Garrett Corporation, Los Angeles, Calif.

[21] Appl. No.: 746,418

[22] Filed: Jun. 19, 1985

Related U.S. Application Data

[62] Division of Ser. No. 515,331, Jul. 19, 1983.

[51] Int. Cl.[4] ............................................. H02K 21/12
[52] U.S. Cl. .................................... 310/156; 310/42; 310/218; 310/261; 29/598
[58] Field of Search ................. 310/156, 42, 152, 153, 310/218, 261, 179, 262; 29/596, 598; 324/146

[56] References Cited

U.S. PATENT DOCUMENTS

| | | | |
|---|---|---|---|
| 3,531,670 | 9/1970 | Loudon | 310/156 |
| 3,707,638 | 12/1972 | Nailen | 310/156 |
| 3,979,821 | 9/1975 | Noodleman | 310/156 |

FOREIGN PATENT DOCUMENTS

| | | | |
|---|---|---|---|
| 0681348 | 9/1939 | Fed. Rep. of Germany | 310/156 |
| 0050507 | 4/1974 | Japan | 310/156 |
| 0455231 | 10/1936 | United Kingdom | 310/156 |
| 0774195 | 5/1957 | United Kingdom | 310/156 |

*Primary Examiner*—R. Skudy
*Attorney, Agent, or Firm*—Leslie S. Miller; James W. McFarland; Albert J. Miller

[57] ABSTRACT

A permanent magnet rotor having a unitary aluminum casting surrounding magnets mounted on the shaft which has favorable heat transfer, performance, and cost characteristics, and which may be constructed by the accompanying method. Spacers and rings surrounding the permanent magnets are eliminated by the aluminum casting. Pockets for the permanent magnets are cast into the aluminum. A non-magnetic outer sleeve overlies the shaft, magnets and aluminum layer.

9 Claims, 8 Drawing Figures

PERMANENT MAGNET ROTOR

This is a division of application Ser. No. 515,331 filed July 19, 1983.

BACKGROUND OF THE INVENTION

Generators for use in aerospace applications are high output, high speed devices with critical weight and volume restrictions. Such devices typically have permanent magnet rotors, which have a plurality of rare earth permanent magnet elements located on a shaft of magnetizable material. The shaft has a number of flat machined faces about its periphery, onto which the rare earth permanent magnet elements are mounted.

Spacers of aluminum or some other non-magnetizable material are located around the periphery of the shaft in the areas between the magnets, and rings of the same type of non-magnetizable material are located on both ends of the shaft axially adjacent the annulus of permanent magnets and spacers. To prevent the magnets from moving radially outward during the high-speed rotation of the rotor, an outer sleeve also made of non-magnetizable material is shrink fitted over the magnets, spacers, and rings.

Such construction, while producing acceptable generators for most aerospace applications, presents several major problems resulting in reduced performance, a high reject rate, and a relatively high unit cost. The most critical performance problem is that of heat buildup in the rotor. Even if the spacers between the magnets and the rings adjacent the ends of the magnets are machined very carefully, the heat transfer characteristics of the rotor are not uniform, thus leading to heat buildup which may possibly result in damage to the rare earth permanent magnets. A second, and closely related, problem is that of machining the spacers and rings to fit properly. Since the rotor must be stable at very high rotational speeds, if the rings and spacers do not fit exactly, thus allowing relative movement of the components under the outer sleeve, the result will be an unbalanced condition in the rotor possibly resulting in dynamic failure of the device.

A further problem encountered in the construction of such a permanent magnet rotor is that the rotor assembly does not have good rigidity or shaft stiffness, which will in turn reduce the flexure critical speed of the device, the maximum speed of rotation without significant dynamic vibration occurring. Since the rotor must be turned at a very high rate of speed, the lack of proper stiffness in the shaft construction will result in a high rejection rate at best, and possibly in a product which will not perform within the required specifications. Finally, construction of the permanent magnet rotor with a shaft, magnets, spacers and rings, and the outer sleeve is an extremely expensive method of manufacture. The very precise tolerance requirements of the spacers and rings and the high unit rejection rate both add further to the high cost of construction of such rotors.

In certain aerospace applications, it is desirable to have more than one set of magnets located on a single shaft. In such cases, the shaft is relatively long and contains a plurality of sets of permanent magnets spaced axially away from each other on the shaft. For example, a shaft having three sets of magnets would have sequentially located on the shaft a ring, a set of magnets and spacers, a second ring, a second set of magnets and spacers, a third ring, a third set of magnets and spacers, and a fourth ring. Such an assembly does not have sufficient shaft stiffness to allow the shaft to be turned at the required high speed. Long before the shaft reaches the desired operation speed, the flexure critical speed will be reached and dynamic failure will occur.

Therefore, it can be seen that a new type of construction for such high-speed, permanent magnet rotor machines is required. Any new construction technique must minimize heat buildup in the rotor, eliminate the problem of improper fit between the spacers, magnets, and rings, and ensure that the shaft has sufficient rigidity while maintaining or improving the cost characteristic of the device.

SUMMARY OF THE INVENTION

The present invention eliminates the spacers and rings surrounding the permanent magnets by casting a non-magnetic material, preferably aluminum, directly on to the steel shaft. Pockets or apertures for the permanent magnets are cast into the aluminum, and need not be machined out.

The rare earth permanent magnets are then installed into the pockets on the shaft, and the rotor assembly may then be machined. Finally, a non-magnetic outer sleeve is installed on the shaft, preferably by heat-shrinking the sleeve onto the shaft. Final balancing of the rotor may then occur.

If the casting operation for the particular rotor assembly to be constructed is to be done on a relatively small scale, blocks the size of the magnets to be used may be installed on flats machined into the shaft, after which the aluminum casting operation may take place. If, however, a substantial number of rotor assemblies are to be manufactured, the assembly may be die cast by constructing a die with retractable blocks which may be inserted into the mold adjacent the flats on the shaft, after which the aluminum may be injected around the shaft. The blocks may then be retracted from the mold, and the workpiece may be removed from the die.

Since the aluminum is injected around blocks which are the same size as the permanent magnets, when the rotor is assembled the aluminum fits the magnets so closely that excess heat buildup in the magnets is no longer a problem, since the close-fitting aluminum acts as a uniform and highly efficient heat sink. Since rings and spacers are no longer used, the tolerance problems accompanying their use is no longer present. Substantial costs are saved in the reduced amount of machining of the rotor (and in the elimination of machining spacers and rings) which must be done.

Since the aluminum is injected around the entire area of the shaft not to be occupied by the magnets, the completed assembly will have excellent rigidity characteristics, greatly increasing the flexure critical speed and reducing the possibility of dynamic unbalance in the rotor leading to machine failure. Finally, since fewer parts and operations are required by the technique of the present invention, the cost of manufacturing the rotor is significantly reduced. Even rotor assemblies having multiple rotor sections on a single shaft may be constructed by this technique without substantial difficulty.

DESCRIPTION OF THE DRAWINGS

These and other advantages of the present invention are best understood through reference to the drawings, in which.

DETAILED DESCRIPTION OF THE PREFERRED EMBODIMENT

Figure 1:
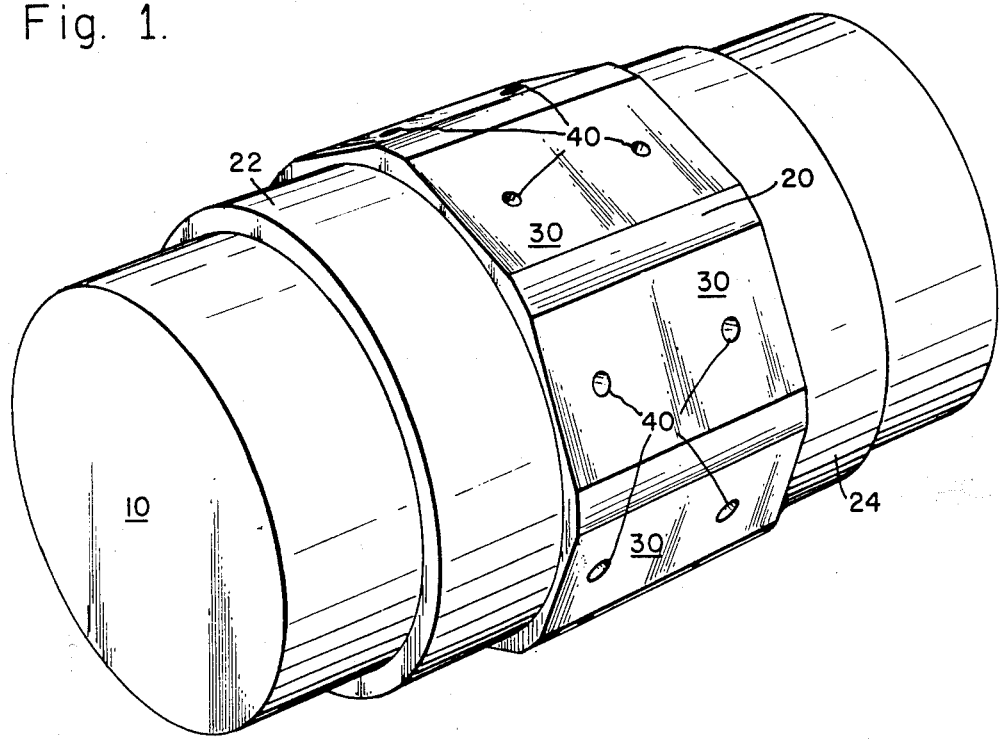
FIG. 1 is a perspective view of a shaft which has been machined in preparation for the casting operation.

In FIG. 1 a shaft 10 which has been machined in preparation for the casting operation is shown. The shaft 10 is first turned to a larger outer diameter, a portion of which is shown as indicated at 20. The areas on the shaft axially adjacent to the portion of the shaft on to which the permanent magnets will be located are machined to a second smaller diameter, as indicated at 22 and 24.

The larger diameter 20 portion of the shaft 10 then has a number of flat faces 30 machined uniformly around the shaft, the number of faces 30 being equal to the number of magnets to be installed around the periphery of the shaft 10. Even at their smallest radius, these faces 30 extend outwardly somewhat from the smaller diameter areas 22, 24, the smaller diameter areas 22, 24 being located below the level of the magnets to avoid flux flow therein. The shaft is constructed of a magnetizable material such as steel.

In the preferred embodiment, which is more suitable for construction of a limited number of rotors rather than full scale production of rotors, two threaded holes 40 are machined into each face 30 on the shaft 10. It should be noted that in large scale production utilizing die casting techniques, the threaded holes 40 would be unnecessary.

Figure 2:
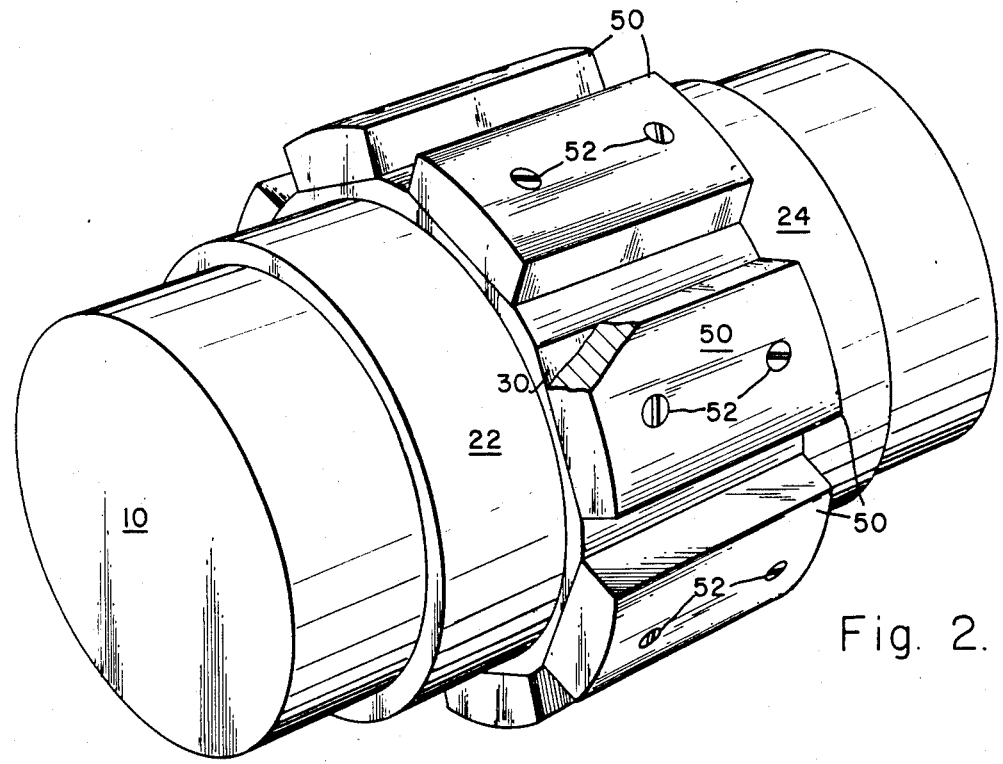
FIG. 2. is a perspective view of the shaft of FIG. 1 with blocks mounted in the locations where permanent magnets are to be installed.

In the next step, depicted in FIG. 2, blocks 50 which are exactly identical in size and shape to the permanent magnets to be installed later are mounted onto the faces 30 of the shaft 10. The blocks 50 may be made out of cold rolled steel. The preferred material to be cast onto the shaft 10 is aluminum, although other non-magnetizable materials could be used.

Each block 50 is installed onto a face 30 on the shaft 10 using two screws 52, which are countersunk into the blocks 50. The blocks 50 may be the same size as the magnets to be installed, since aluminum casting does not involve substantial shrinkage of the aluminum as it cools. So that the blocks may be easily removed from the shaft 10 after casting, the sides of the blocks 50 may be slightly tapered; for example, the size of the blocks may be one-half degree out of parallel to allow the blocks to be easily removed after the casting operation. The shaft may then have the aluminum casting operation performed thereon.

Figure 3:
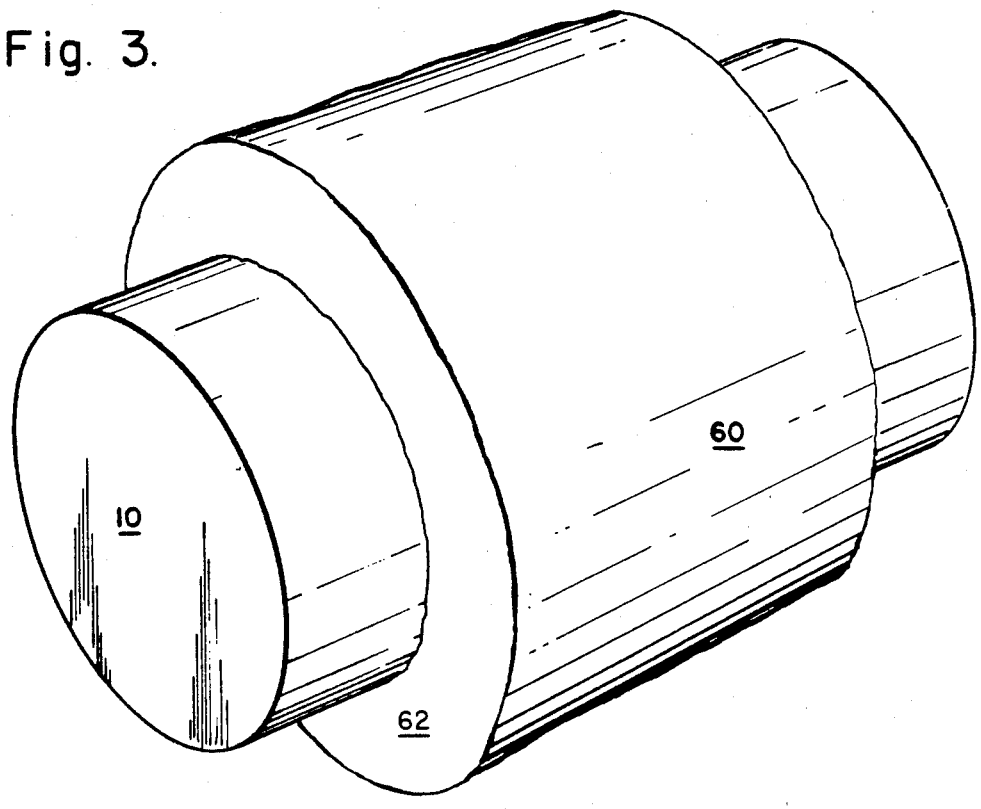
FIG. 3 is a perspective view of the shaft of FIG. 2 with aluminum cast onto the steel shaft.

FIG. 3 shows the shaft 10 with a cast aluminum surface 60 having side areas 62 extending over the surface area of the shaft 10 including the two reduced diameter areas 22, 24 (FIG. 1). The diameter of the cast aluminum 60 should be slightly greater than the outside diameter of the blocks 50 (FIG. 2) to insure that roughness in the outer surface of the aluminum casting will not affect the finished product after machining.

It has been found that by forming a carbon layer on the shaft 10 before the blocks 50 are installed and the aluminum 60 is cast aids in ensuring that the aluminum seeps onto all outer surfaces of the shaft 10, including the areas adjacent the intersection between the blocks 50 and the shaft 10. Such a carbon layer may be formed on the shaft 10 by running the flame from an acetylene torch briefly across the surface of the shaft 10.

The shaft 10 together with the aluminum casting 60 is then machine turned to take the aluminum layer 60 down to a diameter slightly larger than the desired finished diameter, which slightly larger diameter is the same diameter as the tops of the blocks 50. In addition, the side areas 62 of the aluminum casting 60 facing the ends of the shaft 10 are machined flat.

Figure 4:
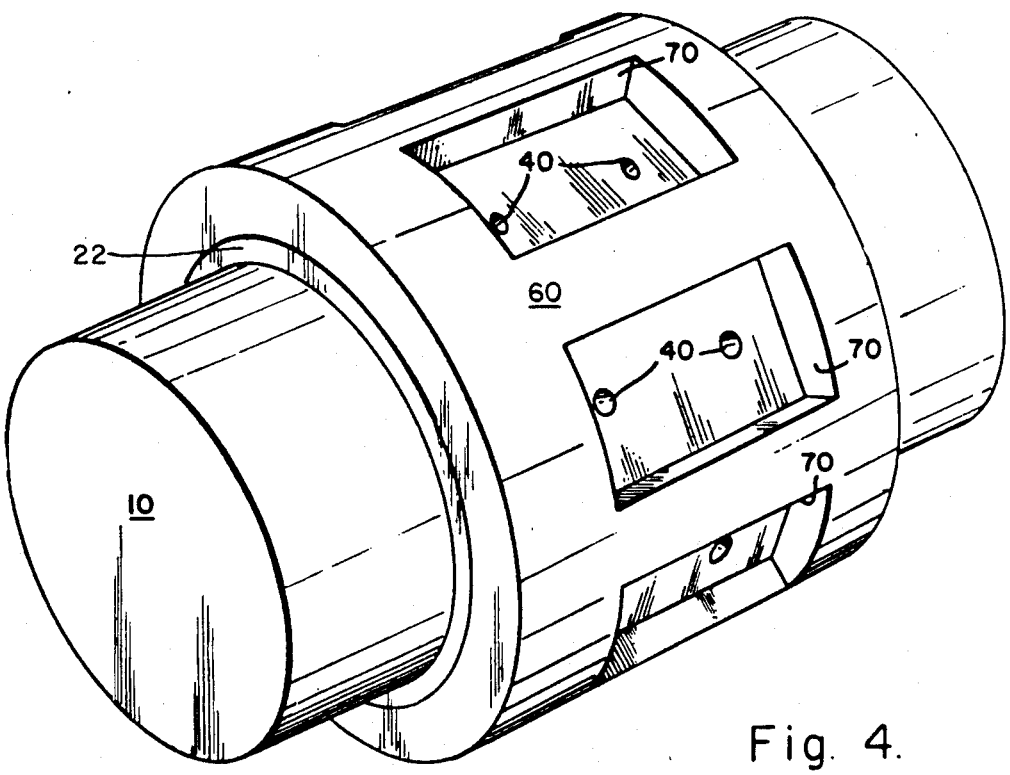
FIG. 4 is a perspective view of the shaft of FIG. 3 with the aluminum machined down to the diameter of the magnets and the blocks removed from the shaft.

The blocks 50 are then removed from the shaft 10 by removing the exposed screws 52 holding them in place. In order to aid in the removal of the blocks 50 it has been found that threads of a larger diameter than that of the screws 52 may be machined into th holes in the block 50 through which the screws 52 fit freely. While the screws 52 fit freely through the threaded holes in the blocks 50, a larger diameter screw (not shown) may be inserted into these threaded holes in the blocks 50 after the screws 52 are removed, and the blocks may be pulled out of the aluminum casting 60. The shaft 10 and aluminum cast material 60 then appear as shown in FIG. 4.

Figure 5:
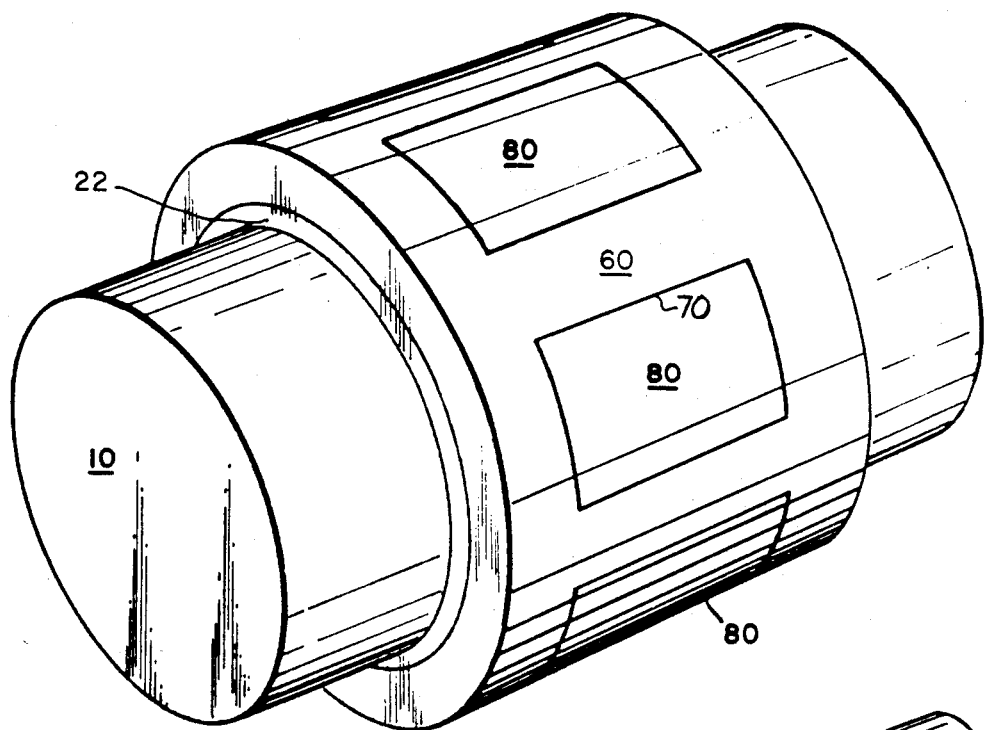
FIG. 5 is a perspective view of the shaft of FIG. 4 with the permanent magnets installed and the final machining operation performed.

The next step is to install the permanent magnets, which are typically rare earth permanent magnets such as samarium cobalt or al-nickel. The magnets 80, which are usually of a rectangular configuration having flat faces, are installed into the apertures 70 (FIGS. 4 and 5), into which the magnets 80 fit exactly. Generally, the magnets 80 are so strong that they may be installed into the apertures 70 as shown in FIG. 5 without the use of any adhesive since the magnets 80 will be strongly attracted to the magnetizable material of the shaft 10.

In some cases, if the outer diameter of the rotor is large enough, and if the speed at which the device will operate is high enough, it may be desirable to utilize an adhesive material which may be installed in the aperture 70 before the installation of the magnets 80.

After the magnets 80 are installed, the shaft 10 may then be turned to machine the flat outer-surfaces of the magnets 80, which as stated above are typically flat and must be machined round, as well as to turn the aluminum casting 60 down to the desired finished diameter.

Figure 6:
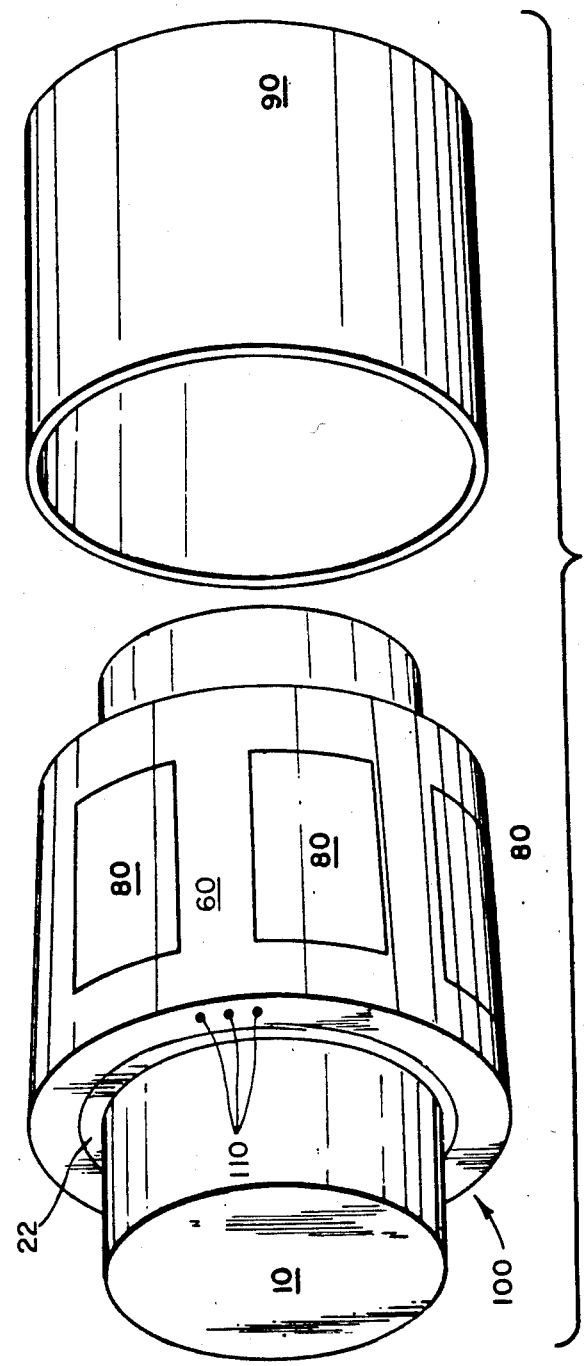
FIG. 6 shows an exploded, perspective view of the installation of the outer sleeve onto the shaft assembly of FIG. 5.

The final assembly step is to install the outer shell 90 on to the rotor assembly 100, as shown in FIG. 6. The outer shell is typically non-magnetic steel such as IN-CO-718, a material which is both extremely strong and non-magnetic. Another material which may be used for the shell 90 in certain applications is berillium-copper. In either case, the shell 90 thickness is kept to a minimum to keep the distance between the magnets 80 and a stator 300 of the device (FIG. 8) as small as possible. Typically, the shell 90 thickness may vary from 0.04 inches to 0.28 inches. Factors in determining the required shell thickness include the diameter of the rotor assembly 100, the speed at which the device will operate, and the related centrifugal force operating on the rotor assembly 100.

The fit of the shell 90 on the rotor assembly 100 is a high-interference fit. The preferred method for installation on the shell 90 is to put the rotor assembly 100 in dry ice, to heat the shell 90, and to immediately install the shell 90 onto the rotor assembly 100. The shell 90 is then immediately cooled by directing water onto the shell 90 and the rotor assembly 100, to prevent any possible heat damage to the magnets 80. The rotor assembly 100 and the shell 90 may then be balanced by drilling holes 110 in the side of the aluminum casting portion 60 of the rotor assembly 100.

Figure 7:
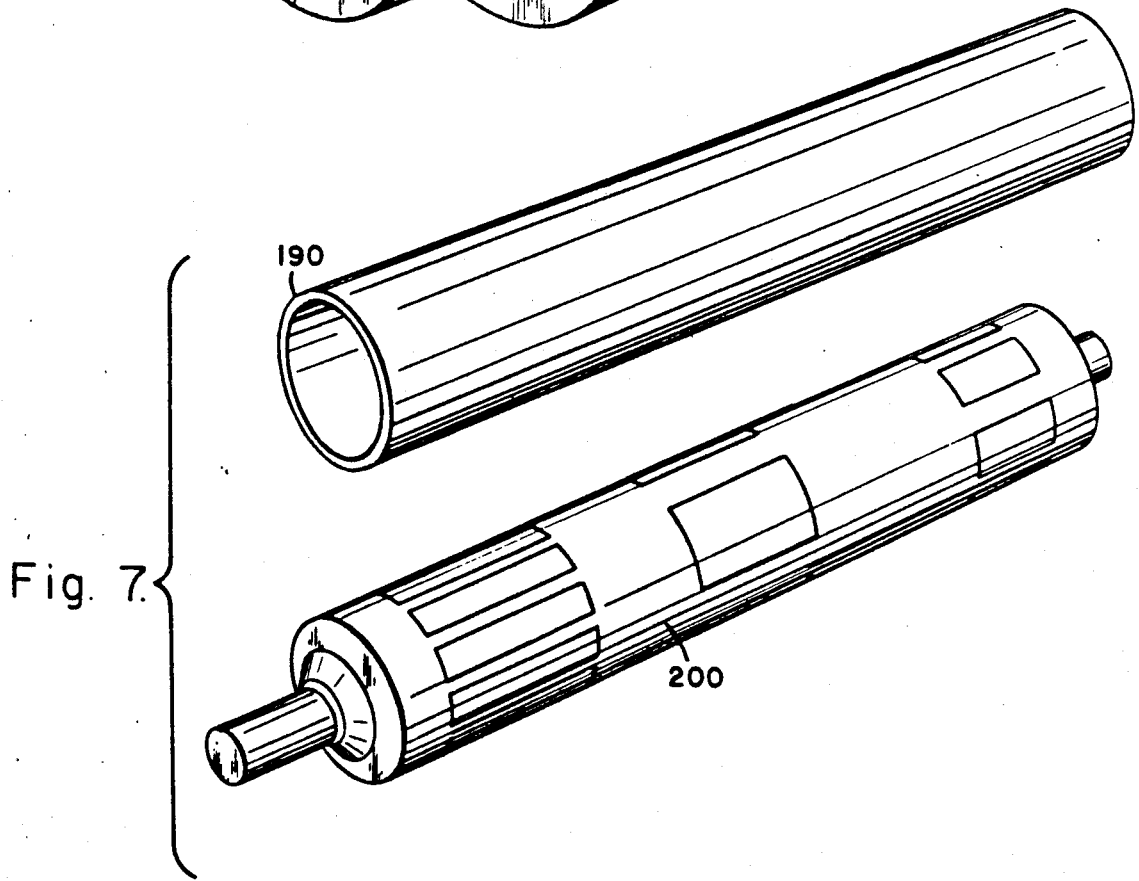
FIG. 7 shows a shaft containing three separate rotors in a completed state prior to installation of the outer sleeve.

FIG. 7 shows a rotor assembly 200 containing three separate sets of magnets which may be manufactured according to the present invention. The rotor assembly 200 is covered with a shell 190. Such a rotor assembly containing multiple sets of magnets is virtually impossible to manufacture utilizing the spacer and ring technique, but is quite simple to manufacture using the teachings of the present invention. The resulting rotor assembly 200 has sufficient shaft stiffness to ensure that the flexure critical speed is sufficiently high to attain the desired operating speed.

As mentioned above, if the rotor assembly 100 is to be manufactured in quantity, the preferred technique is to die cast the aluminum coating 60 onto the shaft 10. The die (not shown) is constructed so that it has retractable blocks, and when the shaft 10 is mounted in the die, the blocks are moved inwardly adjacent the flat surfaces 30 on the shaft 10. The molten aluminum is then injected into the die, and the retractable blocks are removed from the die, which may then be opened to remove the shaft 10 containing the aluminum coating 60. The device is then machined and finished exactly as described above.

Figure 8:
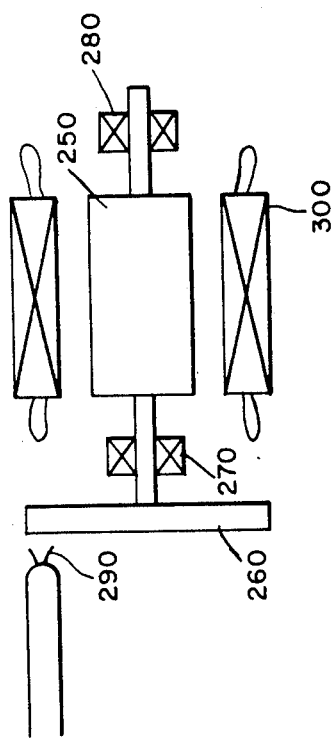
FIG. 8 is a schematic view of a turboalternator utilizing the present invention.

One possible use of a rotor constructed according to the teachings of this disclosure is in a turboalternator, that is, a rotor assembly 250 driven at high speed by a turbine wheel 260, as illustrated in FIG. 8. The rotor assembly 250 is supported by bearings 270 and 280, and is connected to and drives the turbine wheel 260. A nozzle 290 directs hot gas onto the turbine wheel 260. The stator 300 is mounted around the rotor assembly 250. Of course, many other possible uses for the present invention exist, and are too numerous to list here.

A rotor assembly manufactured according to the above teachings is substantially less susceptible to excess heat buildup in the magnets, thus effectively eliminating failure of the device due to destruction of the permanent magnets. Since rings and spacers are eliminated by the casting of aluminum directly on to the steel shaft, the requirements of high tolerance machining of components is substantially reduced, along with the high rejection rate of rotors with components not fitting properly. The resulting rotor has excellent rigidity, even allowing for multiple sets of magnets on a single shaft. Finally, the manufacturing technique taught herein substantially reduces the cost of manufacturing rotor assemblies, while resulting in rotor assemblies having higher and more uniform quality.

What is claimed is:

1. A permanent magnet rotor, comprising:
   a shaft of magnetizable material;
   a layer of non-magnetizable material formed around the periphery of said shaft, said layer having a first plurality of apertures therein disposed circumferentially about said rotor with each of said apertures extending radially inwardly through said layer to said shaft;
   a first plurality of rare earth permanent magnets, each of said magnets fitting into one of said apertures in a manner whereby the sides of each of said magnets are surrounded by said layer, said layer thereby acting as a heat sink for said magnets;
   a sleeve of non-magnetizable material installed over said magnets and the portion of said layer surrounding said magnets.

2. A permanent magnet rotor as defined in claim 1, wherein said shaft has a plurality of flat areas circumferentially arranged therein, said flat areas being configured to receive said permanent magnets, said flat areas extending outward from adjacent surface areas of said shaft to prevent flux flow in said adjacent surface areas.

3. A permanent magnet rotor as defined in claim 1, wherein said layer is aluminum and is secured onto said shaft.

4. A permanent magnet rotor as defined in claim 1, wherein said permanent magnets are samarium cobalt.

5. A permanent magnet rotor as defined in claim 1, wherein said sleeve is thin to maximize flux flow therethrough, having a thickness of from 0.04 to 0.28 inches.

6. A permanent magnet rotor as defined in claim 1, wherein said sleeve is manufactured of INCO-718 steel.

7. A permanent magnet rotor as defined in claim 1, further comprising:
   a second plurality of apertures in said layer extending around the circumference of said rotor from the outer circumference of said shaft through said layer, said second plurality of apertures spaced axially away from said first plurality of apertures; and
   a second plurality of rare earth permanent magnets fitting in said second plurality of apertures.

8. A permanent magnet rotor, comprising:
   a shaft of magnetizable material with a plurality of flat surfaces of rectangular configuration machined circumferentially around the outer surface of said shaft, said flat surfaces being raised from or level with the adjacent surfaces of said shaft;
   a plurality of permanent magnets installed on said flat surfaces of said shaft, said magnets being of a rectangular configuration matching the shape of said flat surfaces, the outer surfaces of said magnets being of a predetermined diameter from the center of said shaft;
   a layer of non-magnetizable material formed on the outer surface of said shaft excluding said flat surfaces containing said magnets mounted thereon, said layer surrounding said magnets and being of an outer diameter equal to said predetermined diameter of said outer surfaces of said magnets; and
   a cylindrical sleeve of non-magnetizable material overlying said magnets to retain said magnets on said shaft when said rotor is turned at high speed.

9. A permanent magnet rotor as defined in claim 1, wherein said permanent magnets are al-nickel.

* * * * *